(12) United States Patent
Hemphill et al.

(10) Patent No.: US 12,046,842 B2
(45) Date of Patent: Jul. 23, 2024

(54) BATTERY AND BATTERY CLAMP SYSTEMS

(71) Applicant: GM GLOBAL TECHNOLOGY OPERATIONS LLC, Detroit, MI (US)

(72) Inventors: Andrew Hemphill, Royal Oak, MI (US); Mahantesh S. Parashetti, Novi, MI (US); Lyall Kenneth Winger, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 274 days.

(21) Appl. No.: 17/663,032

(22) Filed: May 12, 2022

(65) Prior Publication Data

US 2023/0369789 A1 Nov. 16, 2023

(51) Int. Cl.
*H01R 11/28* (2006.01)
*B60R 16/033* (2006.01)

(52) U.S. Cl.
CPC .......... *H01R 11/287* (2013.01); *B60R 16/033* (2013.01); *H01R 11/289* (2013.01); *H01R 2201/26* (2013.01)

(58) Field of Classification Search
CPC  H01R 11/287; H01R 11/289; H01R 2201/26; B60R 16/033; Y02E 60/10
See application file for complete search history.

(56) References Cited

U.S. PATENT DOCUMENTS

| 10,658,771 | B2 * | 5/2020 | Krass | H01R 11/283 |
| 10,727,470 | B2 * | 7/2020 | Roosdorp | H01M 50/502 |
| 2018/0076437 | A1 * | 3/2018 | Goldschmidt | H01R 13/641 |

FOREIGN PATENT DOCUMENTS

| CN | 215645120 U * | 1/2022 | B60R 16/03 |
| DE | 102018217604 A1 * | 4/2020 | G01R 31/364 |
| EP | 3696917 A1 * | 8/2020 | H01R 11/282 |
| WO | WO-2010044111 A1 * | 4/2010 | H01R 11/283 |

* cited by examiner

*Primary Examiner* — Jean F Duverne
(74) *Attorney, Agent, or Firm* — Lorenz & Kopf, LLP (57) ABSTRACT

A battery clamp system for a battery includes a terminal receiving portion configured to be coupled to a terminal of the battery. The battery clamp system includes an anti-rotation projection coupled to the terminal receiving portion. The anti-rotation projection is configured to be coupled to the battery. The anti-rotation projection extends along an axis that is parallel to a longitudinal axis of the battery clamp system. The battery clamp system includes a first flange coupled to the terminal receiving portion that extends along a first flange axis substantially perpendicular to the longitudinal axis. The battery clamp system includes a second flange coupled to the terminal receiving portion so as to be spaced apart from the first flange. The first flange is configured to cooperate with the second flange to couple the terminal receiving portion to the battery.

20 Claims, 7 Drawing Sheets

BATTERY AND BATTERY CLAMP SYSTEMS

INTRODUCTION

The technical field generally relates to batteries and systems for coupling an electrical system to a battery, and more particularly relates to a battery associated with a vehicle and battery clamp systems for coupling an electrical system associated with the vehicle to the battery.

Most vehicles are equipped with a battery, which supplies power to an electrical system associated with the vehicle. Generally, the battery includes a pair of terminals, which are each connected to the electrical system associated with the vehicle. In one example, a wiring harness associated with the electrical system is clamped to the terminals to supply power to the electrical system. As electrical systems become more complex, the wiring harness associated with the electrical system may be stiffer. A stiffer wiring harness may make it harder to couple and retain the wiring harness on the terminals.

Thus, it is desirable to provide a battery and battery clamp systems, which enable stiffer wiring harnesses to be coupled and retained on a terminal of the battery. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a battery clamp system for a battery. The battery clamp system includes a terminal receiving portion configured to be coupled to a terminal of the battery. The battery clamp system includes an anti-rotation projection coupled to the terminal receiving portion. The anti-rotation projection is configured to be coupled to the battery. The anti-rotation projection extends along an axis that is parallel to a longitudinal axis of the battery clamp system. The battery clamp system includes a first flange coupled to the terminal receiving portion that extends along a first flange axis substantially perpendicular to the longitudinal axis. The battery clamp system includes a second flange coupled to the terminal receiving portion so as to be spaced apart from the first flange. The first flange is configured to cooperate with the second flange to couple the terminal receiving portion to the battery.

The battery clamp system includes a nut coupled to the second flange. The first flange defines a first flange bore, the second flange defines a second flange bore coaxially aligned with the nut and the first flange bore, and the first flange bore, the second flange bore and the nut are configured to receive a mechanical fastener to couple the terminal receiving portion to the terminal. The battery clamp system includes a third flange that includes a third arm coupled to the terminal receiving portion and a third flange portion, the third arm extends along a third axis substantially parallel to the longitudinal axis, and the third flange portion extends along a fourth axis substantially perpendicular to the longitudinal axis. The anti-rotation projection is coupled to the terminal receiving portion so as to be opposite the first flange and the second flange. The battery clamp system includes a terminal coupling flange. The terminal coupling flange is coupled to the terminal receiving portion and extends along a second axis that is substantially perpendicular to the longitudinal axis. The terminal coupling flange defines a central bore, which is configured to receive a second mechanical fastener to couple the terminal receiving portion to the terminal. The first flange, the second flange, the anti-rotation projection and the terminal receiving portion are integrally formed so as to be one-piece.

Further provided is a vehicle. The vehicle includes a battery having a terminal and an anti-rotation slot defined through a surface of the battery proximate the terminal. The vehicle includes a battery clamp system configured to be coupled to the terminal. The battery clamp system includes a clamp having a terminal receiving portion configured to be positioned about the terminal. The battery clamp system includes an anti-rotation projection coupled to the terminal receiving portion configured to be coupled to the anti-rotation slot. The anti-rotation projection extends along a projection axis that is parallel to a longitudinal axis of the clamp. The battery clamp system includes a first flange coupled to the terminal receiving portion that extends along a first flange axis substantially perpendicular to the longitudinal axis. The battery clamp system includes a second flange coupled to the terminal receiving portion so as to be spaced apart from the first flange. The first flange is configured to cooperate with the second flange to couple the terminal receiving portion to the battery. The battery clamp system includes a third flange coupled to the terminal receiving portion between the anti-rotation projection and the first flange.

The battery clamp system further comprises a nut coupled to the second flange. The first flange defines a first flange bore, the second flange defines a second flange bore coaxially aligned with the nut and the first flange bore, and the first flange bore, the second flange bore and the nut are configured to receive a mechanical fastener to couple the terminal receiving portion to the terminal. The third flange includes a third arm coupled to the terminal receiving portion and a third flange portion, the third arm extends along a third axis substantially parallel to the longitudinal axis, and the third flange portion extends along a fourth axis substantially perpendicular to the longitudinal axis. The anti-rotation projection is coupled to the terminal receiving portion so as to be opposite the first flange and the second flange. The battery clamp system includes a terminal coupling flange, the terminal coupling flange is coupled to the terminal receiving portion and extends along a second axis that is substantially perpendicular to the longitudinal axis. The terminal of the battery includes an internal threaded bore, the terminal coupling flange defines a central bore and a second mechanical fastener is configured to couple the terminal receiving portion to the terminal. The terminal of the battery includes an internal bore, and the terminal coupling flange defines a central bore that is configured to receive a second mechanical fastener to couple the terminal receiving portion to the terminal. The terminal of the battery includes a threaded post, the terminal coupling flange defines a central bore that is configured to receive the threaded post, and a second mechanical fastener is configured to engage the threaded post to couple the terminal receiving portion to the terminal.

Also provided is a vehicle. The vehicle includes a battery having a terminal defining an internal threaded bore and an anti-rotation slot defined through a surface of the battery proximate the terminal. The vehicle includes a battery clamp system configured to be coupled to the terminal. The battery clamp system includes a clamp having a terminal receiving portion configured to be positioned about the terminal. The battery clamp system includes an anti-rotation projection coupled to the terminal receiving portion. The anti-rotation projection is configured to be coupled to the anti-rotation slot. The anti-rotation projection extends along a projection axis that is parallel to a longitudinal axis of the clamp. The battery clamp system includes a first flange coupled to the terminal receiving portion that extends along a first flange axis substantially perpendicular to the longitudinal axis. The battery clamp system includes a second flange coupled to the terminal receiving portion so as to be spaced apart from the first flange, and a third flange coupled to the terminal receiving portion between the anti-rotation projection and the first flange. The battery clamp system includes a terminal coupling flange coupled to the terminal receiving portion between the second flange and the anti-rotation projection. The terminal coupling flange defines a coupling bore configured to be coaxially aligned with the internal threaded bore and configured to receive a mechanical fastener to couple the clamp to the terminal.

The first flange defines a first flange bore, the second flange includes a nut and defines a second flange bore coaxially aligned with the nut and the first flange bore, and the first flange bore, the second flange bore and the nut are configured to receive a second mechanical fastener to couple the terminal receiving portion to the terminal. The anti-rotation projection is coupled to the terminal receiving portion so as to be opposite the first flange and the second flange, and the terminal coupling flange substantially encloses an end of the terminal receiving portion.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. In addition, those skilled in the art will appreciate that embodiments of the present disclosure may be practiced in conjunction with any number of systems, and that the system described herein is merely an exemplary embodiment of the present disclosure. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. Also, as used herein, the terms "about" and "substantially" denote within 10% to account for manufacturing tolerances.

Figure 1:
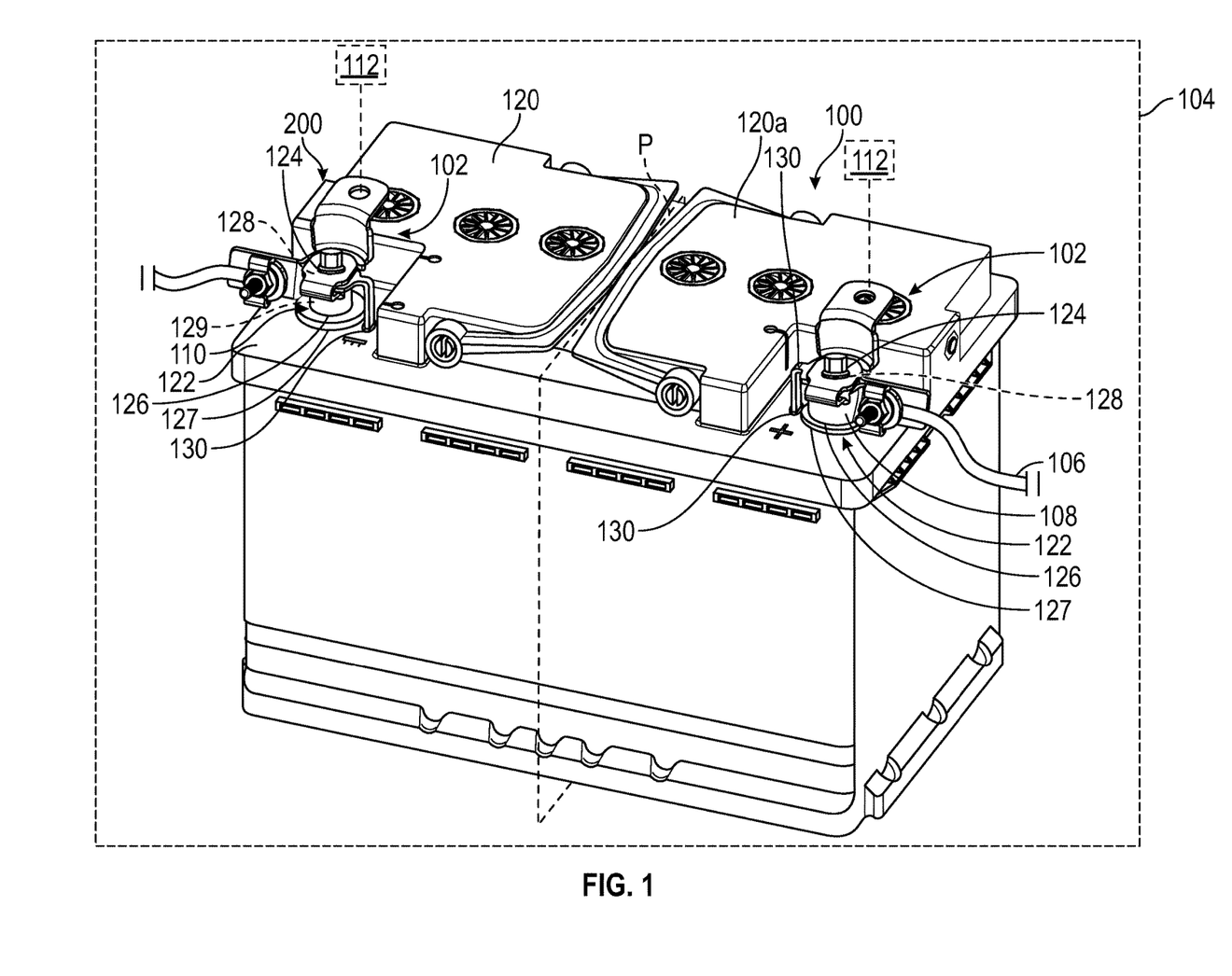
FIG. 1 is a perspective view of an exemplary battery associated with a vehicle, which includes an exemplary battery clamp system coupled to each of the terminals associated with the battery in accordance with various embodiments.

With reference to FIG. 1, an exemplary battery 100 and battery clamp system 102 are shown. In this example, the battery 100 is associated with a vehicle 104, including, but not limited to a motor vehicle, motorcycle, sport utility vehicle, truck, cargo van, bus, etc. As will be discussed, the battery clamp system 102 cooperates with the battery 100 to secure an electrical system associated with the vehicle, which in one example, includes a wiring harness 106 to a first terminal 108 and a second terminal 110 of the battery 100. The battery clamp system 102 also secures a fuse box 112 associated with the electrical system of the vehicle 104 to the terminals 108, 110. It should be noted that while the battery clamp system 102 is discussed herein as electrically and mechanically coupling the fuse box 112 to the battery 100, the battery clamp system 102 may alternatively or in addition electrically and mechanically couple a battery eliminator circuit to the battery 100. Generally, the battery clamp system 102 mechanically and electrically couples the wiring harness 106 and the fuse box 112 of the electrical system to the terminals 108, 110. The battery clamp system 102 cooperates with the battery 100 to secure the wiring harness 106 to the battery 100 when the wiring harness 106 is stiff or inflexible. In addition, the battery clamp system 102 ensures the wiring harness 106 and the fuse box 112 remain coupled to the battery 100 throughout the operation of the vehicle 104 by providing a robust coupling between the battery 100 and the battery clamp system 102. It should be noted that the battery clamp system 102 may also be used with other batteries, and that the use of the battery clamp system 102 with the battery 100 is merely an example.

The battery 100 comprises any battery that provides a source of electric power, including, but not limited to, a flooded lead acid battery, absorbent glass mat battery, enhanced flooded battery, gel cell battery, lithium ion battery, nickel metal hydride battery, lead acid battery, etc. In this example, the battery 100 is mirror-symmetric about a plane of symmetry P. The battery 100 includes the first terminal 108 and the second terminal 110. In this example, the first terminal 108 is a positive terminal, and the second terminal 110 is a negative terminal 110. A battery case 120 encloses a majority of the components of the battery 100, and includes cut-out regions 122 that surround the first terminal 108 and the second terminal 110 to provide clearance for the coupling of the battery clamp system 102 to the battery 100.

Figure 2:
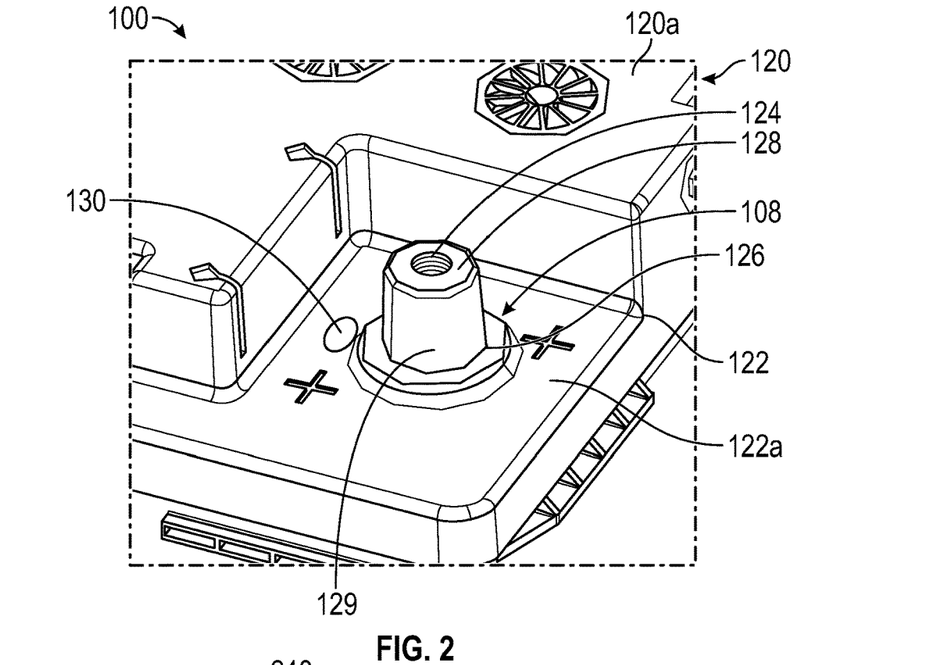
FIG. 2 is a detail view of the battery of FIG. 1, in which the battery clamp system is uncoupled from a terminal of the battery.
Figure 5:
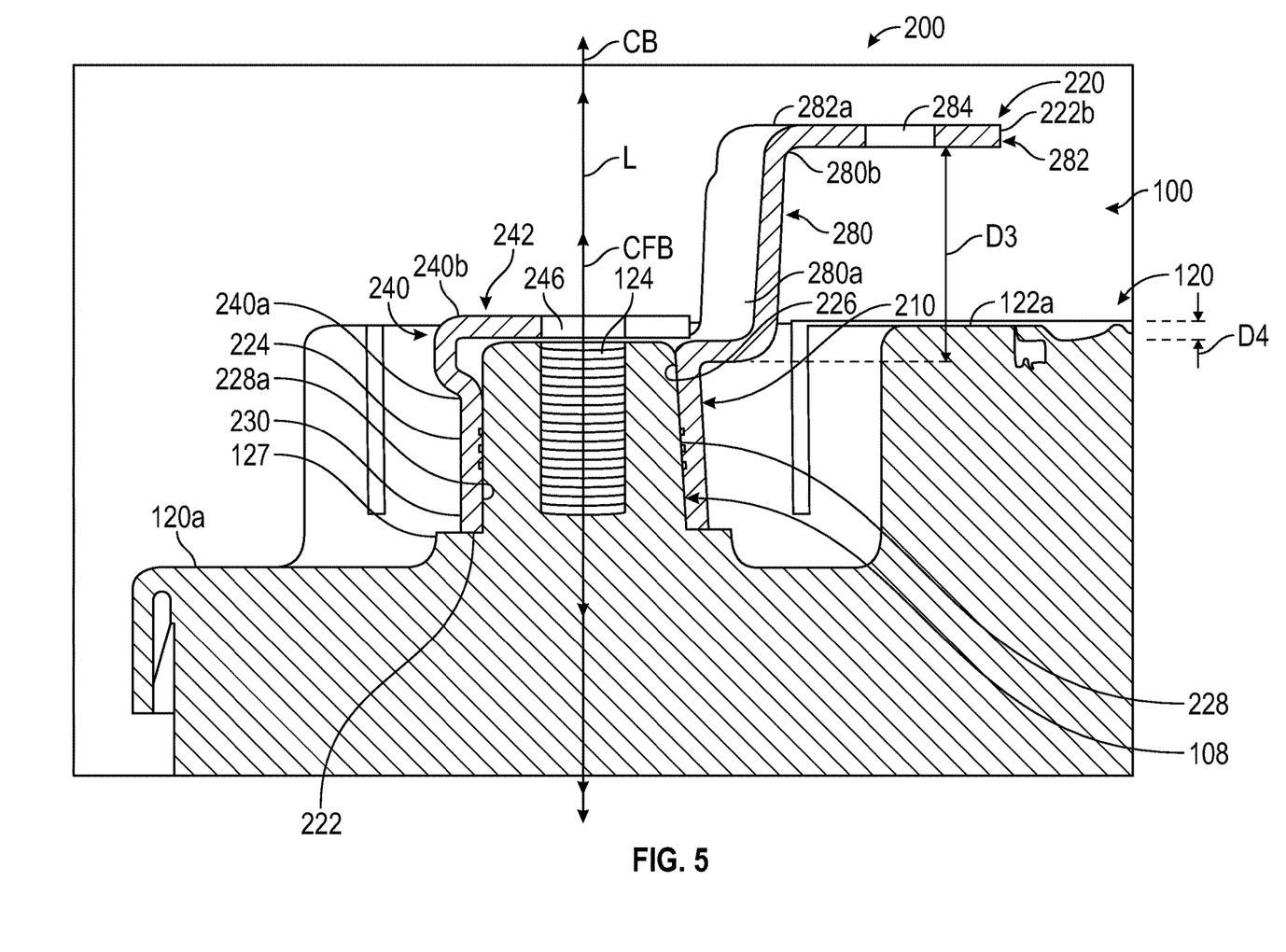
FIG. 5 is a cross-sectional view of the battery and battery clamp system, taken along line 5-5 of FIG. 3.

In one example, each of the first terminal 108 and the second terminal 110 are tapered posts, which each define an internal threaded bore 124. The first terminal 108 and the second terminal 110 may be composed of metal or metal alloy, such as lead, which may be cast, forged, machined, reflow melted, etc. to form the first terminal 108 and the second terminal 110. Generally, the first terminal 108 and the second terminal 110 are each cylindrical, and include a sidewall 129 that tapers from a first, bottom terminal end 126 of the terminal 108, 110 to a second, top terminal end 128 of the terminal 108, 110. The sidewall 129 interconnects the top terminal end 128 with the bottom terminal end 126. Generally, the sidewall 129 has a height of about 18 millimeters (mm) between the bottom terminal end 126 and the top terminal end 128. With additional reference to FIG. 2, the internal threaded bore 124 assists in coupling the battery clamp system 102 to the battery 100, and is defined through the top terminal end 128 of the terminal 108, 110 to extend toward the bottom terminal end 126 (FIG. 5). In FIG. 2, the battery clamp system 102 is removed to illustrate the first terminal 108, with the understanding that the second terminal 110 is mirror-symmetric to the first terminal 108. In this example, the battery case 120 includes a collar 127 that abuts the bottom terminal end 126, however, in other examples, the bottom terminal end 126 may be coplanar with a surface 122a of the cut-out regions 122 of the battery case 120. A sidewall 129 interconnects the top terminal end 128 with the bottom terminal end 126. The sidewall 129 may include a taper, such that the first terminal 108 tapers from the bottom terminal end 126 to the top terminal end 128. Generally, the sidewall 129 has a height of about 18 millimeters (mm) between the bottom terminal end 126 and the top terminal end 128.

In one example, the battery 100 also includes an anti-rotation feature associated with each terminal 108, 110, such as an anti-rotation slot 130. The anti-rotation slot 130 is defined through the surface 122a of the battery case 120 in the cut-out regions 122 proximate the respective one of the terminals 108, 110. The anti-rotation slot 130 cooperates with the battery clamp system 102 to inhibit a rotation of the battery clamp system 102 relative to the terminal 108, 110.

Figure 3:
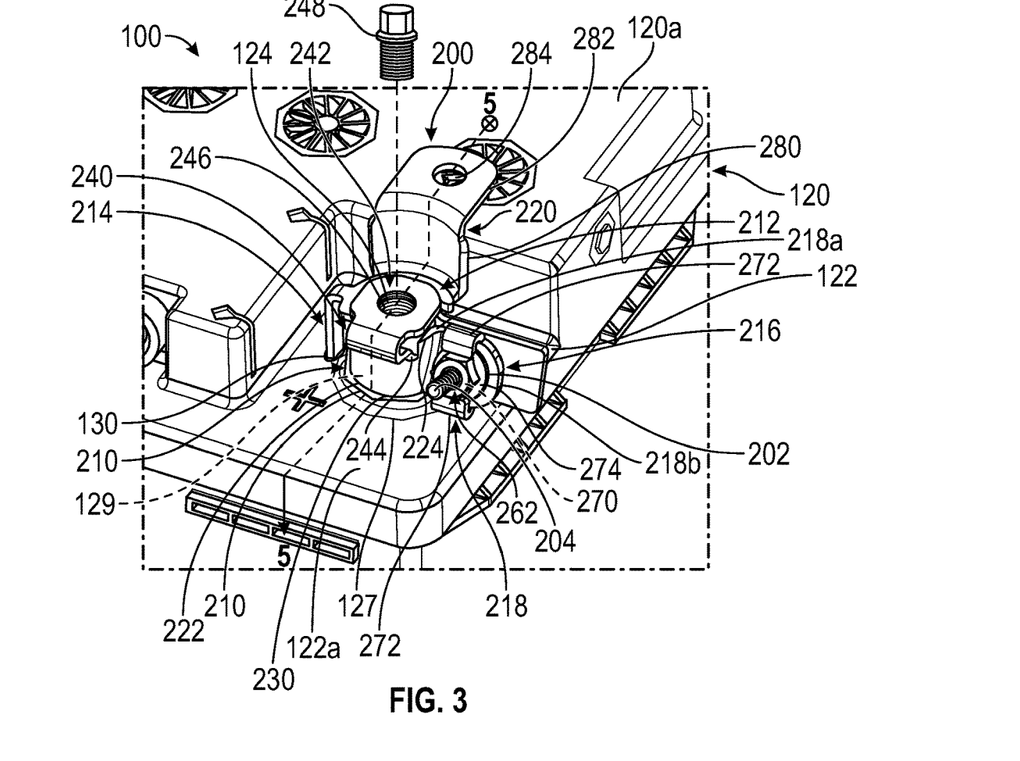
FIG. 3 is a detail view of the battery of FIG. 1, in which the battery clamp system is coupled to the terminal of the battery.

The battery clamp system 102 is coupled to each of the terminals 108, 110. As the battery clamp system 102 coupled to each of the terminals 108, 110 is substantially similar or the same, a single battery clamp system 102 will be discussed in detail herein for ease of description. With reference to FIG. 3, the battery clamp system 102 is shown coupled to the first terminal 108. In this example, the battery clamp system 102 includes a clamp 200, a nut 202 and a mechanical fastener or bolt 204. The clamp 200 is compressible by the cooperation of the bolt 204 with the nut 202 to tighten about the first terminal 108 and couple the battery clamp system 102 to the battery 100. In one example, the clamp 200 is composed of a conductive material, including, but limited to a metal or metal alloy, such as a stainless steel. The clamp 200 may be stamped, forged, cast, additively manufactured, etc. In one example, the clamp 200 is integrally formed, monolithic or one-piece. The clamp 200 includes a terminal receiving portion 210, a terminal coupling flange 212, an anti-rotation projection 214, a first flange or harness coupling flange 216, a second flange or clamp flange 218 and a third flange or fuse coupling flange 220.

Figure 4:
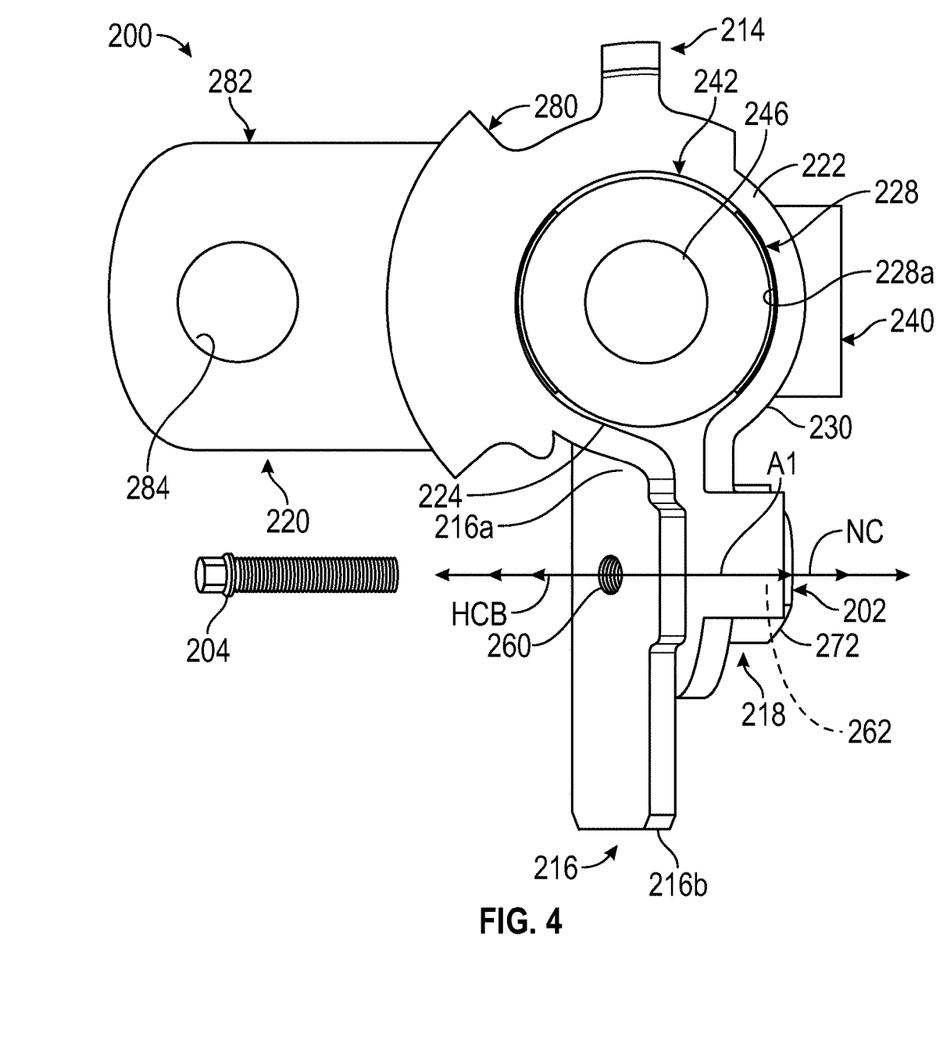
FIG. 4 is a bottom view of the battery clamp system.

The terminal receiving portion 210 is configured to be coupled about the sidewall 129 of the first terminal 108. In this example, the terminal receiving portion 210 is defined by a portion of the clamp 200 and is annular to receive the respective terminal 108, 110. The terminal receiving portion 210 tapers from a first, bottom end 222 to an opposite second, top end 224. The terminal receiving portion 210 has a height, which is different and in this example, less than the height of the sidewall 129. In this example, the terminal receiving portion 210 has a height of about 15 millimeters (mm) to about 16 millimeters (mm). The bottom end 222 is coupled to the first terminal 108 to be proximate or adjacent to the collar 127 at the bottom terminal end 126, while the top end 224 is proximate or adjacent to the top terminal end 128. With reference to FIG. 4, a bottom view of the clamp 200 and the nut 202 is shown. The terminal receiving portion 210 defines a terminal opening 226 from the top end 224 to the bottom end 222. The terminal opening 226 is centered about a longitudinal axis L of the clamp 200. An internal perimeter 228 of the terminal opening 226 includes a roughened surface 228a, such as knurling, to assist in coupling the terminal receiving portion 210 to the terminal 108, 110. With reference back to FIG. 3, an external perimeter 230 of the terminal receiving portion 210 is opposite the internal perimeter 228. The external perimeter 230 is substantially smooth.

In one example, the terminal coupling flange 212 partially or substantially encloses an end of the terminal receiving portion 210 (FIG. 4). The terminal coupling flange 212 includes an arm 240 and a flange 242. The arm 240 is integrally formed with a portion of the top end 224 of the terminal receiving portion 210. In one example, a pair of notches 244 may be defined in the top end 224 on either side of the arm 240 to enable the arm 240 to be bent or folded relative to the top end 224. With reference to FIG. 5, a cross-section of the battery clamp system 102 is shown. The arm 240 is integrally formed with a portion of the top end 224 at a first arm end 240a, and is integrally formed with the flange 242 at a second arm end 240b. Generally, the arm 240 is bent or folded relative to the top end 224 of the terminal receiving portion 210 so that the flange 242 is substantially perpendicular to a central bore axis CB of the internal threaded bore 124. With reference back to FIG. 3, the flange 242 is substantially polygonal, and may be substantially square. It should be noted, however, that the flange may have any desired shape. The flange 242 defines a central flange bore 246. In this example, the central flange bore 246 is configured to receive a mechanical fastener, such as a bolt 248, to couple the battery clamp system 102 to the battery 100. The central flange bore 246 extends along a central flange bore axis CFB, which is coaxially aligned with the central bore axis CB of the internal threaded bore 124 of the first terminal 108 when the battery clamp system 102 is coupled to the battery 100. The central flange bore axis CFB is also substantially parallel to the longitudinal axis L of the clamp 200. The longitudinal axis L of the clamp 200 is also the longitudinal axis of the battery clamp system 102. The flange 242 is substantially perpendicular to the longitudinal axis L.

Figure 6:
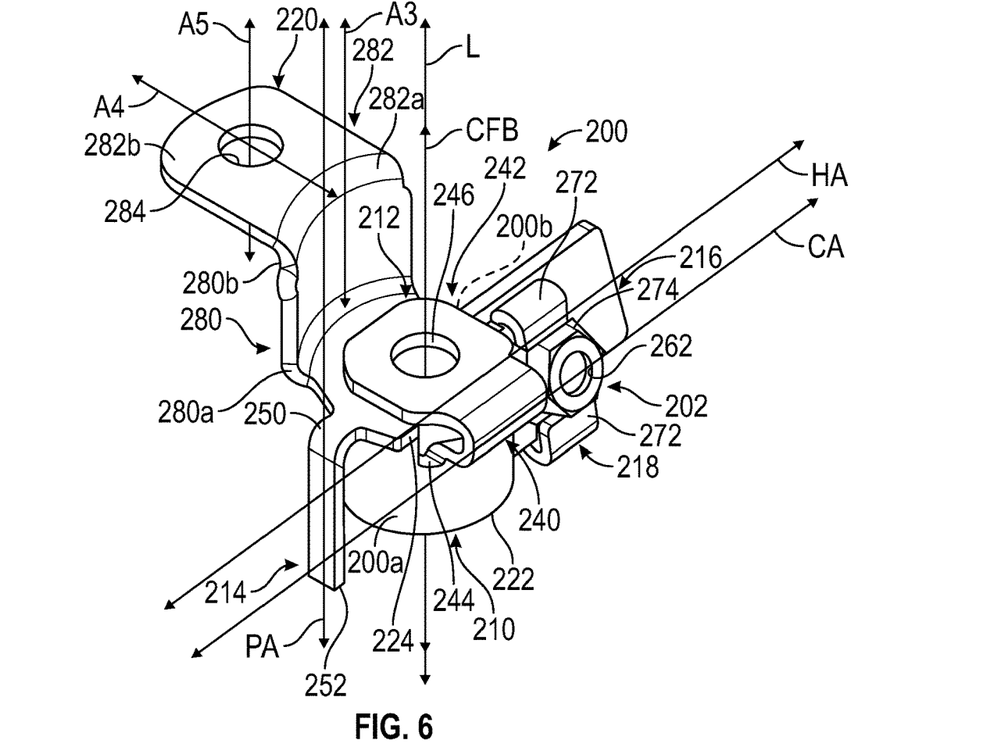
FIG. 6 is a perspective view of a first side of the battery clamp system.

With reference to FIG. 6, the anti-rotation projection 214 is integrally formed with or coupled to the top end 224 of the terminal receiving portion 210. Generally, the anti-rotation projection 214 is integrally formed with or coupled to the terminal receiving portion 210 on a first side 200a of the clamp 200, which is opposite a second side 200b of the clamp 200. In one example, the anti-rotation projection 214 is elongated and substantially rectangular in cross-section. The anti-rotation projection 214 includes a first projection end 250 integrally formed with the top end 224, and an opposite second projection end 252. The first projection end 250 is folded or bent, such that the anti-rotation projection 214 extends along a projection axis PA from proximate the first projection end 250 to the second projection end 252. The projection axis PA is substantially parallel to the central flange axis CFB of the central flange bore 246. The projection axis PA is also substantially parallel to the longitudinal axis L of the clamp 200. The second projection end 252 is sized to be received within the anti-rotation slot 130 (FIGS. 1-3) of the battery 100 to inhibit a rotation of the battery clamp system 102 relative to the battery 100. By inhibiting the rotation of the battery clamp system 102 relative to the battery 100, the anti-rotation projection 214 assists in ensuring that the clamp 200 remains coupled to the battery 100 during the application of a force or torque to the wiring harness 106 (FIG. 1), for example. In addition, the anti-rotation projection 214 ensures that the clamp 200 is orientated correctly on the battery 100 or provides error-proofing during assembly. The engagement of the anti-rotation projection 214 and the anti-rotation slot 130 also increases an ease of assembly of the battery clamp system 102 to the battery 100 by inhibiting the rotation of the battery clamp system 102 during assembly. It should be noted that in other embodiments, the anti-rotation slot 130 may be defined in a surface 120a of the battery case 120 proximate the cut-out region 122, and the anti-rotation projection 214 may extend radially outward from the top end 224 to engage with the anti-rotation slot 130 defined in the surface 120a.

Figure 7:
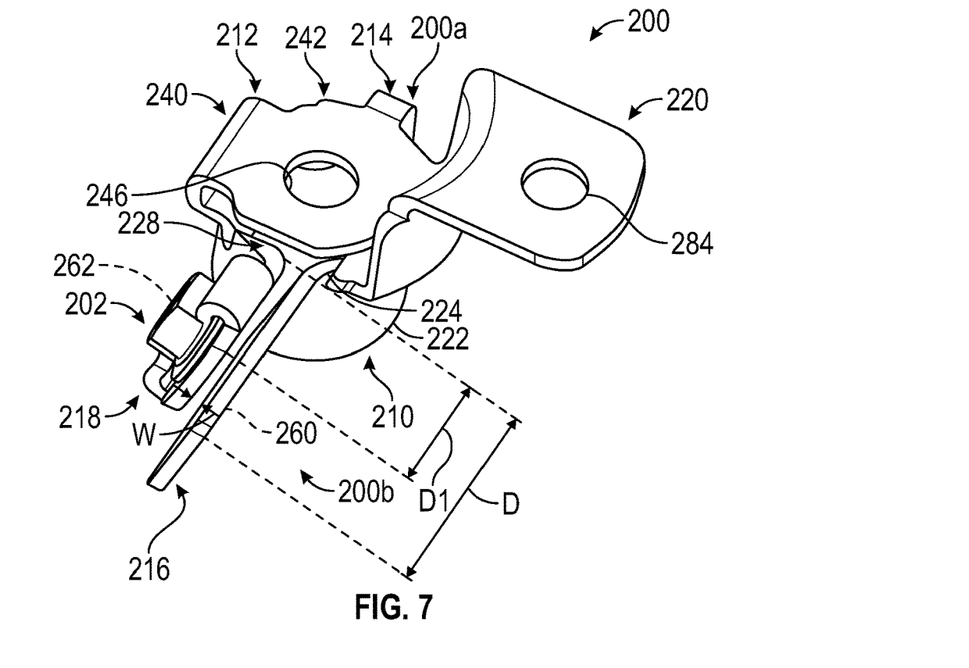
FIG. 7 is a perspective view of a second side of the battery clamp system.

The harness coupling flange 216 extends outwardly from the terminal receiving portion 210 at the second side 210b of the clamp 200. In one example, the harness coupling flange 216 is integrally formed with or coupled to the terminal receiving portion 210 from the top end 224 to the bottom end 222 at the second side 200b. The harness coupling flange 216 includes a first harness end 216a coupled to or integrally formed with the terminal receiving portion 210 and an opposite second harness end 216b. The second harness end 216b defines a terminal end of the harness coupling flange 216. The harness coupling flange 216 is defined on the clamp 200 so as to be substantially opposite the anti-rotation projection 214. The harness coupling flange 216 extends along a first flange axis or harness axis HA, which is substantially perpendicular to the longitudinal axis L of the clamp 200. The harness axis HA of the harness coupling flange 216 is also substantially perpendicular to the projection axis PA of the anti-rotation projection 214. With reference to FIG. 7, the second side 200b of the clamp 200 is shown. The harness coupling flange 216 extends outwardly from the top end 224 of the terminal receiving portion 210 for a distance D. In one example, the distance D is about 27.5 millimeters (mm) to about 29.5 millimeters (mm). The distance D is generally sized to enable the wiring harness 106 (FIG. 1) to be coupled to the harness coupling flange 216 via ultrasonic welding, soldering, etc. For example, the wiring harness 106 may include a ring terminal, which is electrically and mechanically coupled to the harness coupling flange 216. In one example, the bolt 204 passes through the ring terminal to further couple the ring terminal to the harness coupling flange 216. In other embodiments, a mechanical fastener, such as a bolt, may be retained by the ring terminal of the wiring harness 106 and used to mechanically and electrically couple the ring terminal of the wiring harness 106 to the harness coupling flange 216 and the clamp flange 218 by engagement with the nut 202. The distance D of the harness coupling flange 216 also provides support for the attachment of the wiring harness 106 to the clamp 200 and provides a surface for the ultrasonic welding or soldering of the wiring harness 106 to the clamp 200. In one example, the harness coupling flange 216 is spaced a width W apart from the clamp flange 218 to define a gap between the harness coupling flange 216 and the clamp flange 218. In one example, the width W is about 3.0 millimeters (mm) to about 4 millimeters (mm). The width W is predetermined to enable the wiring harness 106 (FIG. 1) to be positioned between the harness coupling flange 216 and the clamp flange 218. The width W also enables the clamp 200 to be positioned about the first terminal 108 during assembly.

With brief reference to FIG. 4, the harness coupling flange 216 defines a first flange bore or harness bore 260. The harness bore 260 is generally defined through the harness coupling flange 216 such that a central axis HCB of the harness bore 260 is coaxially aligned with a central axis NC of the nut bore 262 of the nut 202. The harness bore 260 enables a mechanical fastener, such as the bolt 204, to be received through the harness coupling flange 216 and tightened to couple the clamp 200 to the terminal 108, 110. In this example, the harness bore 260 is defined through the harness coupling flange 216 so as to be offset toward the first harness end 216a between the first harness end 216a and the second harness end 216b. The bolt 204 also clamps the wiring harness 106 (FIG. 1) between the harness coupling flange 216 and the clamp flange 218, and in one example, passes through the ring terminal of the wiring harness 106, which further ensures a mechanical and electrical connection between the wiring harness 106 (FIG. 1) and the clamp 200.

With reference back to FIG. 3, the clamp flange 218 extends outwardly from the terminal receiving portion 210 at the second side 210b of the clamp 200. In one example, the clamp flange 218 is integrally formed with or coupled to the terminal receiving portion 210 from the top end 224 to the bottom end 222 at the second side 200b. The clamp flange 218 includes a first clamp end 218a coupled to or integrally formed with the terminal receiving portion 210 and an opposite second clamp end 218b. The second clamp end 218b defines a terminal end of the clamp flange 218. The clamp flange 218 is defined on the clamp 200 so as to be substantially opposite the anti-rotation projection 214. With brief reference to FIG. 6, the clamp flange 218 extends along a clamp axis CA, which is substantially perpendicular to the longitudinal axis L of the clamp 200. The clamp axis CA of the clamp flange 218 is also substantially perpendicular to the projection axis PA of the anti-rotation projection 214. With reference to FIG. 7, the clamp flange 218 extends outwardly from the top end 224 of the terminal receiving portion 210 for a distance D1. The distance D1 is different and less than the distance D (see also FIG. 3). For example, the distance D1 is about 13.5 millimeters (mm) to about 15.5 millimeters (mm). By providing the clamp flange 218 with a different, shorter distance than the harness coupling flange 216, less material is required for the clamp 200. In addition, the larger distance D facilitates the coupling of the wiring harness 106 (FIG. 1) to the harness coupling flange 216.

With reference back to FIG. 3, the clamp flange 218 also includes a second flange bore or clamp bore 270 and at least one or a pair of clamp tabs 272. The clamp bore 270 is defined along a central axis A1 (FIG. 6), which is coaxial with the central axis of the nut bore 262 and the harness central axis HBC (FIG. 6). The clamp bore 270 is sized to receive the mechanical fastener or the bolt 204 (FIG. 4). The clamp tabs 272 cooperate to retain the nut 202. In one example, the clamp tabs 272 extend from opposed sides of the clamp flange 218 between the first clamp end 218a and the second clamp end 218b. Generally, the clamp tabs 272 are substantially C-shaped, and are bent over a surface of the clamp flange 218 proximate the clamp bore 270. The clamp tabs 272 cooperate to retain a flange 274 of the nut 202 to couple the nut 202 to the clamp flange 218. With brief reference to FIG. 6, the clamp tabs 272 extend along an axis that is substantially perpendicular to the clamp axis CA of the clamp flange 218. The clamp tabs 272 are sized and shaped to couple the nut 202 to the clamp flange 218 while enabling a rotation of the nut 202. By retaining the nut 202, the clamp tabs 272 enable the bolt 204 to be rotated relative to the nut 202 to couple or uncouple the clamp 200 from the battery 100. It should be noted that the use of the clamp tabs 272 is merely exemplary, as the nut 202 may be staked onto the clamp flange 218, if desired.

The fuse coupling flange 220 extends outwardly from the terminal receiving portion 210 along the longitudinal axis L. In one example, the fuse coupling flange 220 includes an arm or a fuse arm 280 and a flange portion or a fuse flange 282. The fuse arm 280 is integrally formed with or coupled to a portion of the terminal receiving portion 210 at the top end 224. The fuse arm 280 is coupled to the top end 224 so as to be opposite the terminal coupling flange 212 and between the first side 200a and the second side 200b of the clamp 200. The fuse arm 280 includes a first arm end 280a coupled to or integrally formed with the terminal receiving portion 210 and an opposite second arm end 280b. The fuse arm 280 generally extends for a distance D3, which is different and greater than a distance D4 between the terminal 108, 110 and the surface 120a (FIG. 5). By having the fuse arm 280 extend for the distance D3, the fuse arm 280 provides space between the surface 120a and the fuse flange 282 for coupling the fuse box 112 between the fuse flange 282 and the surface 120a. The fuse arm 280 extends along a third axis A3 substantially parallel to the longitudinal axis L. The second arm end 280b is coupled to the fuse flange 282.

Figure 8:
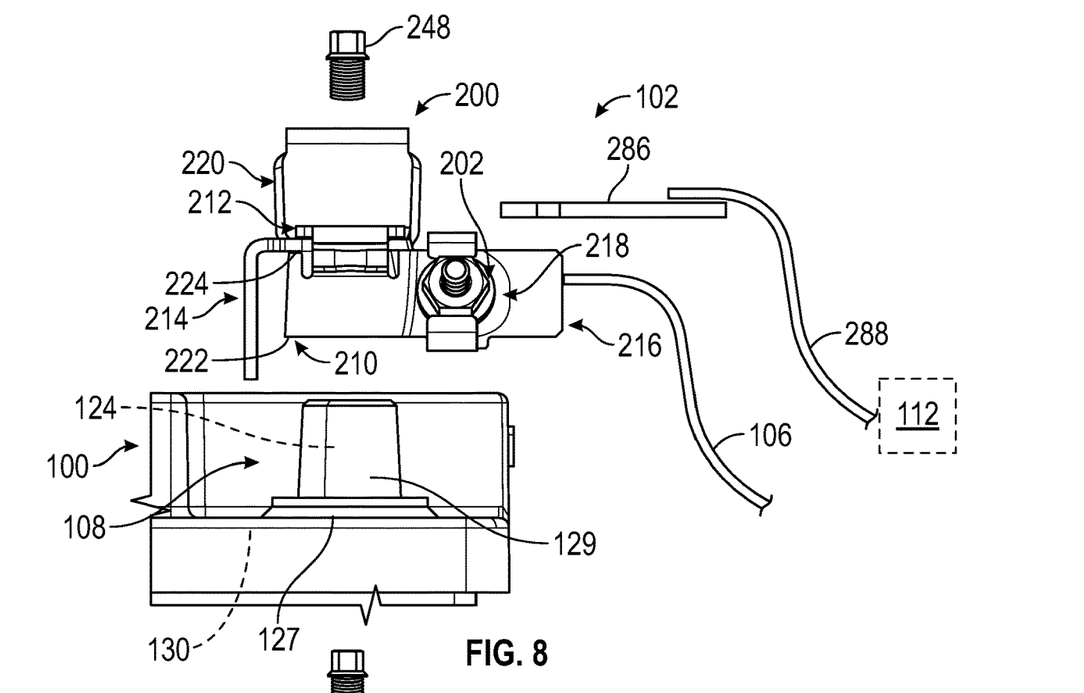
FIG. 8 is a schematic illustration of an electrical system including a wiring harness and a fuse box being coupled to one of the terminals of the battery with the battery clamp system.

The fuse flange 282 extends along a fourth axis A4, which is substantially perpendicular to the third axis A3 of the fuse arm 280 and the longitudinal axis L. The fuse flange 282 includes a first fuse end 282a opposite a second fuse end 282b. The first fuse end 282a is integrally formed with or coupled to the fuse arm 280, and the second fuse end 282b defines a terminal end of the fuse coupling flange 220. The second fuse end 282b is rounded, however, the second fuse end 282b may have any desired shape. The fuse flange 282 defines a fuse coupling bore 284 between the first fuse end 282a and the second fuse end 282b. The fuse coupling bore 284 is circular, and is sized to receive a mechanical fastener, such as a bolt, to couple the fuse box 112 to the fuse coupling flange 220. The fuse coupling bore 284 extends along an axis A5, which is parallel to the axis A3 and the longitudinal axis L. In one example, the fuse box 112 is coupled to the fuse coupling flange 220 via a bus bar 286 (FIG. 8), however, any technique may be employed to electrically couple the fuse box 112 to the clamp 200.

With reference back to FIG. 3, the nut 202 includes the flange 274 and the nut bore 262. The nut 202 is a flange nut, however, other types of nuts may be employed. Generally, the nut 202 is coupled to the clamp flange 218 and is retained on the clamp flange 218 by the clamp tabs 272. The nut 202 cooperates with the bolt 204 to couple the clamp 200 to the battery 100. The bolt 204 has a head, which may include a tool engagement feature for coupling a fastening tool, such as a socket wrench, screwdriver, etc. to the bolt 204 to enable the fastening tool to rotate the bolt 204 relative to the nut 202.

In one example, the battery 100 may be assembled with the first terminal 108 and the second terminal 110 formed to include the internal threaded bore 124. With the clamp 200 formed, the nut 202 is coupled to the clamp 200 so as to be fixed relative to the clamp flange 218 via the clamp tabs 272. Alternatively, the clamp flange 218 may be formed such that the clamp tabs 272 extend radially outward from the opposed sides of the clamp flange 218, and with the nut 202 positioned on the clamp flange 218, the clamp tabs 272 may be folded inward toward the nut 202 to secure the nut 202 to the clamp flange 218. With the nut 202 coupled to the clamp 200, with reference to FIG. 8, the wiring harness 106 is coupled to the harness coupling flange 216 via ultrasonic welding, soldering, etc., such that the wiring harness 106 is coupled between the harness coupling flange 216 and the clamp flange 218. It should be noted that in the example of FIG. 8, the battery clamp system 102 is illustrated as being coupled to the first terminal 108. It will be understood that the coupling of the battery clamp system 102 to the second terminal 110 (FIG. 1) is substantially similar or the same, and thus, the coupling of the battery clamp system 102 to the second terminal 110 will not be discussed in detail herein. With the wiring harness 106 coupled to the harness coupling flange 216, the bus bar 286 is coupled to the fuse coupling flange 220 via a mechanical fastener, such as a bolt. The bus bar 286 is electrically coupled to the fuse box 112, via an electrically conductive wire 288, for example.

With additional reference to FIG. 3, with the wiring harness 106 and the fuse box 112 electrically and mechanically coupled to the clamp 200, the clamp 200 is positioned over the first terminal 108. With the clamp 200 positioned over the first terminal 108, the terminal receiving portion 210 of the clamp 200 is moved downward over the first terminal 108 until the bottom end 222 is proximate or abuts the collar 127 and the terminal coupling flange 212 is proximate or abuts the top terminal end 128. The clamp 200 is positioned about the first terminal 108 such that the anti-rotation projection 214 is received in the anti-rotation slot 130. The bolt 204 is inserted through the nut 202 and tightened, via the fastening tool, to squeeze the terminal receiving portion 210 about the perimeter or sidewall 129 of the first terminal 108 to couple the clamp 200 to the first terminal 108. The bolt 248 is coupled to the internal threaded bore 124 of the first terminal 108 to further retain the clamp 200 on the first terminal 108. With the clamp 200 coupled to the first terminal 108, in order to remove the clamp 200, the bolt 248 is uncoupled from the internal threaded bore 124. The bolt 204 is loosened to unclamp or uncouple the terminal receiving portion 210 from the perimeter of the first terminal 108. The clamp 200 is removed from the first terminal 108.

Figure 9:
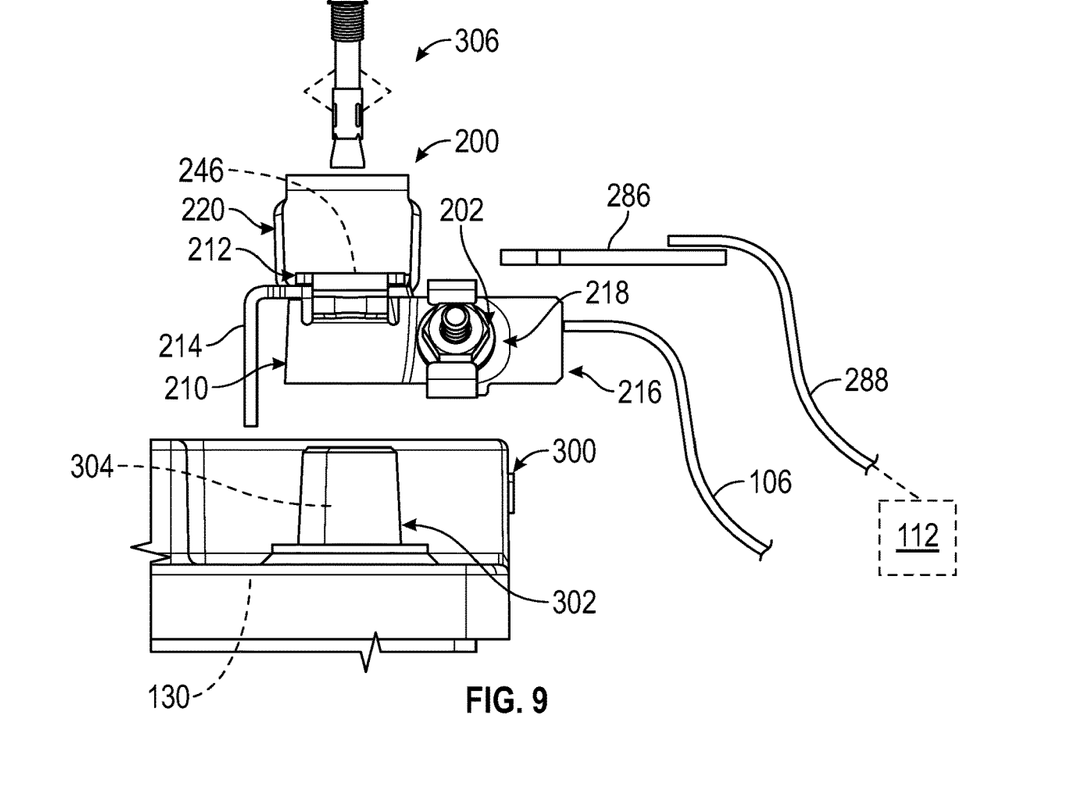
FIG. 9 is a schematic illustration of an electrical system including a wiring harness and a fuse box being coupled to a terminal of another exemplary battery with the battery clamp system in accordance with various embodiments.

It should be noted that while the battery clamp system 102 is described herein as being secured to the battery 100 via the bolt 248 and the internal threaded bore 124, different techniques may be employed to couple the battery clamp system 102 to a battery. For example, with reference to FIG. 9, the battery clamp system 102 is shown for use with a battery 300. The battery 300 includes a terminal 302. The terminal 302 includes an internal bore 304. In this example, a mechanical fastener, such as an expansion bolt 306, is used to couple the clamp 200 to the battery 300. In this example, once the wiring harness 106 and the fuse box 112 are electrically and mechanically coupled to the clamp 200, the clamp 200 is positioned about the terminal 302 such that the anti-rotation projection 214 is received in the anti-rotation slot 130 of the battery 300. With the terminal receiving portion 210 positioned about the terminal 302, the bolt 204 is tightened to squeeze the terminal receiving portion 210 about a perimeter of the terminal 302 to couple the clamp 200 to the battery 300. The expansion bolt 306 is positioned through the central flange bore 246 of the terminal coupling flange 212 and into the internal bore 304. The expansion bolt 306 is deployed to expand and further couple the clamp 200 to the battery 300. It should be noted that instead of the expansion bolt 306, a spring retention clip may be inserted through the central flange bore 246 of the terminal coupling flange 212 and the internal bore 304 to couple the clamp 200 to the terminal 302. In addition, instead of the expansion bolt 306, a push retainer or push pin may be inserted through the central flange bore 246 of the terminal coupling flange 212 and the internal bore 304 to couple the clamp 200 to the terminal 302. The push retainer may include, but is not limited to a closed bottom push pin, a screw type push pin, an open bottom push pin, a T-Head push pin, a fir tree push pin, a rivet, etc. It should also be noted that a dart type retainer may be employed, such as a barbed or tree retainer, a dart retainer or a ratchet retainer. An expansion type retainer may also be employed, such as an expansion rivet.

Figure 10:
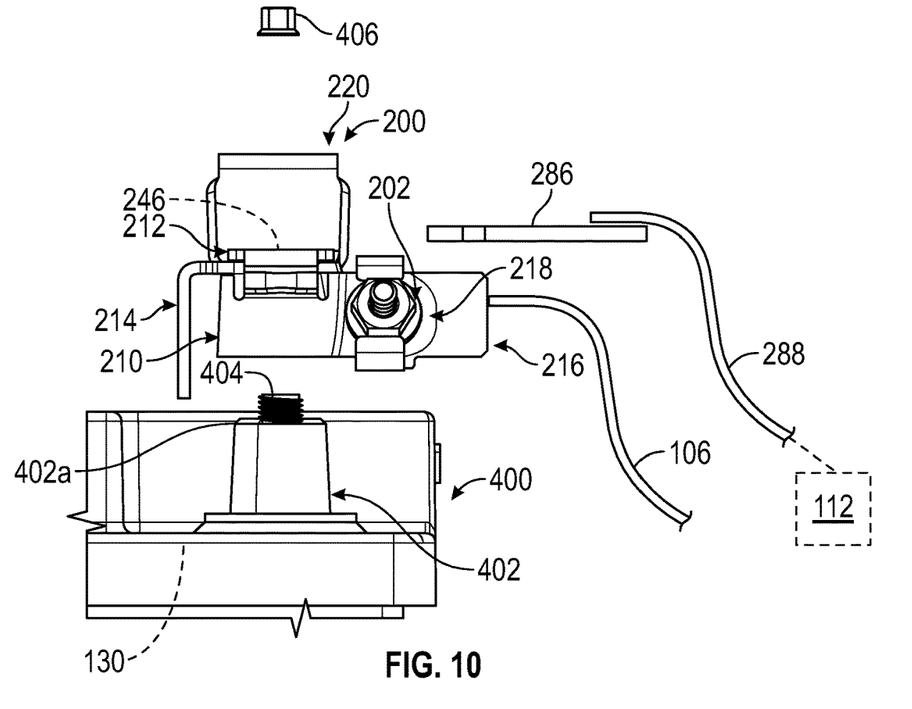
FIG. 10 is a schematic illustration of an electrical system including a wiring harness and a fuse box being coupled to a terminal of another exemplary battery with the battery clamp system in accordance with various embodiments.

In addition, other techniques may be employed to couple the battery clamp system 102 to a battery. For example, with reference to FIG. 10, the battery clamp system 102 is shown for use with a battery 400. The battery 400 includes a terminal 402. The terminal 402 includes a threaded post 404 that extends beyond a first, top end 402*a* of the terminal 402. In this example, a mechanical fastener, such as a threaded nut 406, is used to couple the clamp 200 to the battery 400. In this example, once the wiring harness 106 and the fuse box 112 are electrically and mechanically coupled to the terminal 402, the clamp 200 is positioned about the terminal 402 such that the anti-rotation projection 214 is received in the anti-rotation slot 130 of the battery 400. The threaded post 404 extends through the central flange bore 246 of the terminal coupling flange 212. With the terminal receiving portion 210 positioned about the terminal 402, the bolt 204 is tightened to squeeze the terminal receiving portion 210 about a perimeter of the terminal 402 to couple the clamp 200 to the battery 400. The threaded nut 406 is positioned over the threaded post 404 and tightened to further couple the clamp 200 to the battery 400. In addition, a lock washer may be employed with the threaded nut 406 to couple the clamp 200 to the battery 400.

In addition, while the battery clamp system 102 is described herein as being secured to the battery 100 via the bolt 248 and the internal threaded bore 124, different techniques may be employed to couple the battery clamp system 102 to the battery 100. For example, with reference to FIG. 11, a battery clamp system 502 is shown for use with the battery 100. As the battery clamp system 502 includes components that are substantially similar or the same as the battery clamp system 102, the same reference numerals will be used to denote the same or similar components. In this example, the battery clamp system 502 includes a clamp 504 and the nut 202. In one example, the clamp 504 is composed of a conductive material, including, but limited to a metal or metal alloy, such as a stainless steel. The clamp 504 may be stamped, forged, cast, additively manufactured, etc. In one example, the clamp 504 is integrally formed, monolithic or one-piece. The clamp 504 includes the terminal receiving portion 210, a terminal coupling flange 512, the anti-rotation projection 214, the harness coupling flange 216, the clamp flange 218 and the fuse coupling flange 220.

Figure 11:
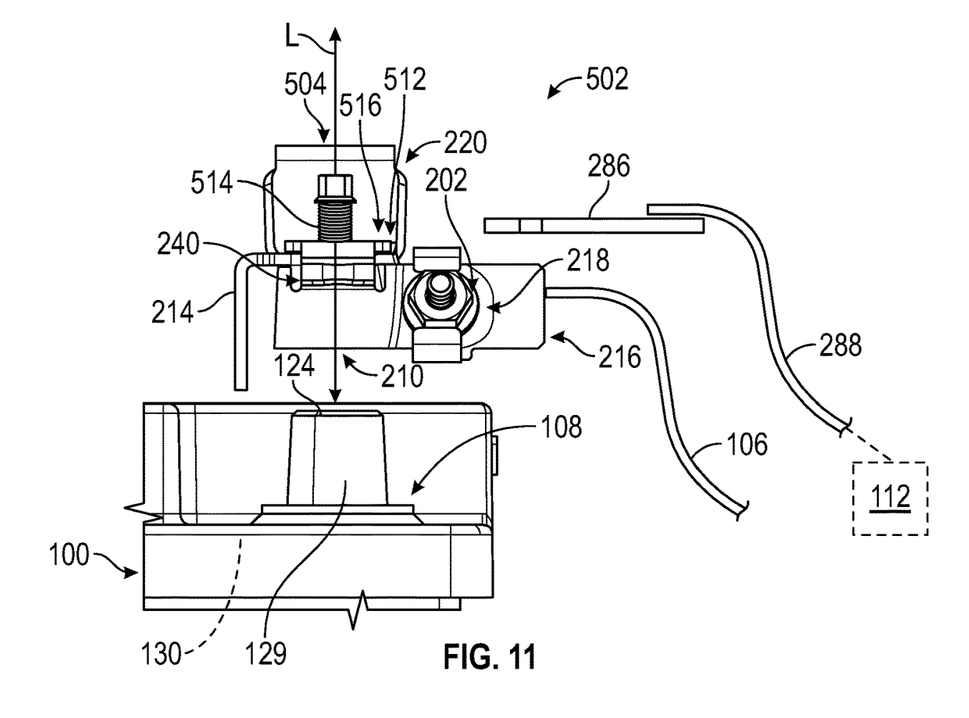
FIG. 11 is a schematic illustration of an electrical system including a wiring harness and a fuse box being coupled to one of the terminals of the battery of FIG. 1 with another exemplary battery clamp system in accordance with various embodiments.

In this example, the terminal coupling flange 512 partially or substantially encloses an end of the terminal receiving portion 210 and retains a mechanical fastener, such as a bolt 514. The terminal coupling flange 512 includes the arm 240 and a flange 516. The flange 516 is substantially polygonal, and may be substantially square. It should be noted, however, that the flange 516 may have any desired shape. The flange 516 defines a central flange bore 246. In this example, the central flange bore 246 is configured to receive the bolt 514, which is retained or captured within the flange 516. Generally, the bolt 514 is configured to be threadably engaged with the threaded bore 124 of the terminal 108, 110, and is retained by the clamp 504. In one example, the flange 516 or the bolt 514 may include one or more features, such as barbs, projections, etc. to couple the bolt 514 to the flange 516, while enabling a relative movement of the bolt 514 to the flange 516. The movement of the bolt 514 relative to the flange 516 couples the bolt 514, and thus, the clamp 504, to the terminal 108, 110 to couple the battery clamp system 502 to the battery 100. The flange 516 is substantially perpendicular to the longitudinal axis, and the bolt 514 extends along an axis substantially parallel to the longitudinal axis L.

In this example, once the wiring harness 106 and the fuse box 112 are electrically and mechanically coupled to the harness coupling flange 216 and the fuse coupling flange 220, respectively, of the clamp 504, the clamp 504 is positioned about the first terminal 108 such that the anti-rotation projection 214 is received in the anti-rotation slot 130 of the battery 100. With the terminal receiving portion 210 positioned about the first terminal 108, the bolt 204 is tightened to squeeze the terminal receiving portion 210 about a perimeter of the first terminal 108 to couple the clamp 504 to the battery 100. The bolt 514 is threadably engaged with the threaded bore 124 of the first terminal 108 to further couple the clamp 504 to the battery 100.

It should be noted that in the instance of the battery 100 having a tapered battery terminal, the clamp 200, 504 may be coupled to and retained on a battery terminal by advancing the bolt 204 through the nut 202 to secure the clamp 200, 504 onto the battery terminal. This enables the battery clamp system 102, 502 to be used with various types of batteries, including batteries that do not include an internal threaded bore or internal bore. This enables the battery clamp system 102, 502 to be retrofit onto existing batteries in the field. In addition, the battery clamp system 102, 502 when used with the battery 100, 300, 400 secures the wiring harness 106 and the fuse box 112 to the battery 100, 300, 400 throughout the operation of the vehicle 99. The use of the anti-rotation projection 214 also ensures that the clamp 200, 504 remains stationary by inhibiting twisting during coupling of the wiring harness 106 to the clamp 200, 504 in instances where the wiring harness 106 is stiff or rigid. The anti-rotation projection 214 also provides error-proofing and ease of assembly of the battery clamp system 102, 502 to the battery 100, 300, 400. The error-proofing provided by the anti-rotation projection 214 also ensures the clamp 200, 504 is installed in the proper position. The clamp flange 218 and the anti-rotation projection 214 help reduce the risk of the clamp 200, 504 inadvertently loosening through vibration or use. The clamp flange 218 and the anti-rotation projection 214 also reduce micro-abrasion during vibration, which ensures the integrity of the electrical conduction between the battery 100, the clamp 200, 504 and the wiring harness 106.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A battery clamp system for a battery, comprising:
   a terminal receiving portion configured to be coupled to a terminal of the battery;
   an anti-rotation projection coupled to the terminal receiving portion, the anti-rotation projection configured to be coupled to the battery, the anti-rotation projection extending along an axis that is parallel to a longitudinal axis of the battery clamp system;
   a first flange coupled to the terminal receiving portion that extends along a first flange axis substantially perpendicular to the longitudinal axis;
   a second flange coupled to the terminal receiving portion so as to be spaced apart from the first flange, and the first flange is configured to cooperate with the second flange to couple the terminal receiving portion to the battery; and
   a third flange that includes a third arm coupled to the terminal receiving portion and a third flange portion, the third arm extends along a third axis substantially parallel to the longitudinal axis, and the third flange portion extends along a fourth axis substantially perpendicular to the longitudinal axis.

2. The battery clamp system of claim 1, further comprising a nut coupled to the second flange.

3. The battery clamp system of claim 2, wherein the first flange defines a first flange bore, the second flange defines a second flange bore coaxially aligned with the nut and the first flange bore, and the first flange bore, the second flange bore and the nut are configured to receive a mechanical fastener to couple the terminal receiving portion to the terminal.

4. The battery clamp system of claim 1, wherein the third flange is configured for coupling with a fuse box.

5. The battery clamp system of claim 1, wherein the anti-rotation projection is coupled to the terminal receiving portion so as to be opposite the first flange and the second flange.

6. The battery clamp system of claim 1, further comprising a terminal coupling flange, the terminal coupling flange is coupled to the terminal receiving portion and extends along a second axis that is substantially perpendicular to the longitudinal axis.

7. The battery clamp system of claim 6, wherein the terminal coupling flange defines a central bore, which is configured to receive a second mechanical fastener to couple the terminal receiving portion to the terminal.

8. The battery clamp system of claim 1, wherein the first flange, the second flange, the anti-rotation projection and the terminal receiving portion are integrally formed so as to be one-piece.

9. A vehicle, comprising:
   a battery including a terminal and an anti-rotation slot defined through a surface of the battery proximate the terminal; and
   a battery clamp system configured to be coupled to the terminal, the battery clamp system including:
   a clamp having a terminal receiving portion configured to be positioned about the terminal, an anti-rotation projection coupled to the terminal receiving portion configured to be coupled to the anti-rotation slot, the anti-rotation projection extending along a projection axis that is parallel to a longitudinal axis of the clamp, a first flange coupled to the terminal receiving portion that extends along a first flange axis substantially perpendicular to the longitudinal axis, a second flange coupled to the terminal receiving portion so as to be spaced apart from the first flange, the first flange configured to cooperate with the second flange to couple the terminal receiving portion to the battery, and a third flange coupled to the terminal receiving portion between the anti-rotation projection and the first flange.

10. The vehicle of claim 9, wherein the battery clamp system further comprises a nut coupled to the second flange.

11. The vehicle of claim 10, wherein the first flange defines a first flange bore, the second flange defines a second flange bore coaxially aligned with the nut and the first flange bore, and the first flange bore, the second flange bore and the nut are configured to receive a mechanical fastener to couple the terminal receiving portion to the terminal.

12. The vehicle of claim 9, wherein the third flange includes a third arm coupled to the terminal receiving portion and a third flange portion, the third arm extends along a third axis substantially parallel to the longitudinal axis, and the third flange portion extends along a fourth axis substantially perpendicular to the longitudinal axis.

13. The vehicle of claim 9, wherein the anti-rotation projection is coupled to the terminal receiving portion so as to be opposite the first flange and the second flange.

14. The vehicle of claim 9, wherein the battery clamp system further comprises a terminal coupling flange, the terminal coupling flange is coupled to the terminal receiving portion and extends along a second axis that is substantially perpendicular to the longitudinal axis.

15. The vehicle of claim 14, wherein the terminal of the battery includes an internal threaded bore, the terminal coupling flange defines a central bore and a second mechanical fastener is configured to couple the terminal receiving portion to the terminal.

16. The vehicle of claim 14, wherein the terminal of the battery includes an internal bore, and the terminal coupling flange defines a central bore that is configured to receive a second mechanical fastener to couple the terminal receiving portion to the terminal.

17. The vehicle of claim 14, wherein the terminal of the battery includes a threaded post, the terminal coupling flange defines a central bore that is configured to receive the threaded post, and a second mechanical fastener is configured to engage the threaded post to couple the terminal receiving portion to the terminal.

18. A vehicle, comprising:
a battery including a terminal defining an internal threaded bore and an anti-rotation slot defined through a surface of the battery proximate the terminal; and
a battery clamp system configured to be coupled to the terminal, the battery clamp system including:
a clamp having a terminal receiving portion configured to be positioned about the terminal, an anti-rotation projection coupled to the terminal receiving portion, the anti-rotation projection configured to be coupled to the anti-rotation slot, the anti-rotation projection extending along a projection axis that is parallel to a longitudinal axis of the clamp, a first flange coupled to the terminal receiving portion that extends along a first flange axis substantially perpendicular to the longitudinal axis, a second flange coupled to the terminal receiving portion so as to be spaced apart from the first flange, a third flange coupled to the terminal receiving portion between the anti-rotation projection and the first flange, and a terminal coupling flange coupled to the terminal receiving portion between the second flange and the anti-rotation projection, the terminal coupling flange defining a coupling bore configured to be coaxially aligned with the internal threaded bore and configured to receive a mechanical fastener to couple the clamp to the terminal.

19. The vehicle of claim 18, wherein the first flange defines a first flange bore, the second flange includes a nut and defines a second flange bore coaxially aligned with the nut and the first flange bore, and the first flange bore, the second flange bore and the nut are configured to receive a second mechanical fastener to couple the terminal receiving portion to the terminal.

20. The vehicle of claim 18, wherein the anti-rotation projection is coupled to the terminal receiving portion so as to be opposite the first flange and the second flange, and the terminal coupling flange substantially encloses an end of the terminal receiving portion.

* * * * *